United States Patent [19]
Favret

[11] Patent Number: 5,681,458
[45] Date of Patent: Oct. 28, 1997

[54] WATER CLARIFICATION EMPLOYING ROTATING DRUM SKIMMER

[76] Inventor: Uncas B. Favret, P.O. Box 2960, Covington, La. 70434

[21] Appl. No.: 546,668
[22] Filed: Oct. 23, 1995
[51] Int. Cl.⁶ .............. C02F 1/24; B01D 17/035; E02B 15/04
[52] U.S. Cl. .............. 210/221.2; 210/703; 210/776; 210/242.3; 210/923
[58] Field of Search .............. 210/242.3, 923, 210/776, 221.1, 221.2, 703, 538, 523

[56] References Cited

U.S. PATENT DOCUMENTS

| | | |
|---|---|---|
| 1,379,176 | 5/1921 | Foster . |
| 1,860,819 | 5/1932 | Schanberger . |
| 2,759,607 | 8/1956 | Boyd . |
| 3,063,939 | 11/1962 | Katz . |
| 3,245,539 | 4/1966 | Earle . |
| 3,338,414 | 8/1967 | Lefke . |
| 3,479,281 | 11/1969 | Kikindai . |
| 3,536,199 | 10/1970 | Cornellius . |
| 3,670,896 | 6/1972 | Hale . |
| 3,831,758 | 8/1974 | Watson . |
| 4,226,706 | 10/1980 | Degner . |
| 4,287,063 | 9/1981 | Stenzel . |

FOREIGN PATENT DOCUMENTS

| | | |
|---|---|---|
| 1517967 | 1/1978 | Germany . |
| 1710514 | 2/1992 | U.S.S.R. . |

*Primary Examiner*—Thomas M. Lithgow
*Attorney, Agent, or Firm*—George A. Bode; Michael L. Hoelter; Bode & Associates

[57] ABSTRACT

An oil/water separator that employs a rotatable drum for separating oil or other contaminants from a fluid, usually water. This drum is partially immersed within the oil containing fluid such that by its rotation therethrough, an oil film adheres to its outer periphery. A blade assembly scrapes or wipes this film from this outer periphery and gathers such film in an adjacent collection trough.

13 Claims, 3 Drawing Sheets

５,６８１,４５８

1

WATER CLARIFICATION EMPLOYING ROTATING DRUM SKIMMER

BACKGROUND OF THE INVENTION

1. Field of the Invention

This invention pertains to oil/water separators in general and, more particularly, to an apparatus and method which separates the oil from the water.

2. General Background

Oil/water separators are commonly used in a variety of different industries as well as in offshore oil and gas applications. As their name implies, oil/water separators function to separate oil from contaminated water so that separate streams can be created for separate downstream cleaning/disposal processes. It is preferable that the resulting water stream be as free of oil as possible and, similarly, it is preferable that the resulting oil stream be as free of water as possible.

In the event the two fluids are not effectively separated, the disposal and/or handling costs associated with each will increase significantly. This is due primarily to the greater costs associated with the oil stream whose volume will be greater than need be due to the unwanted water in the stream. Furthermore, the costs associated with the water stream will also be higher since any such system must also take into account the oil remaining in the water stream. Thus, to improve the operation of both systems, and to reduce the cost of each, the oil and the water must be separated with as little resultant intermixing or "slop" as possible.

One typical design for an oil/water separator is disclosed in U.S. Pat. No. 5,277,803 issued to Broussard, Sr. This patent discloses the use of a series of different stages or chambers through which the to-be-cleaned fluid passes. Such fluid is aerated in each chamber as it passes therethrough. The resulting froth and top fluid layer in each chamber is removed via an adjustable weir. This drawn-off fluid is then transported elsewhere for further processing and/or disposal. Unfortunately, weirs are non-discriminatory in that they permit the flow of any fluid therethrough no matter its composition. Thus, water is able to flow through each weir the same as oil, the only criteria for such flow being that the fluid level must be above the bottom elevation of the weir. While this device does remove oil (i.e. the oil floating on the surface of the water), it also removes a considerable amount of water as well. Consequently, the volume of the separated oil stream that is transported elsewhere for subsequent processing is larger than need be due to the inclusion of the water therein.

U.S. Pat. No. 4,226,706 issued to Degner, et al., discloses an aerator which incorporates paddle wheels that are used to push the froth and top layer of liquid from each cell into an adjacent overflow chute. A paddle wheel, like a weir, is also non-discriminatory in that it forces whatever is between its blades into the adjacent cell, whether it be a froth or a liquid, and it makes no distinction between the type of liquid forced over the edge.

It is thus an object of this invention to provide a device that distinguishes between water and oil such that only oil is removed for further processing and/or cleaning.

Another object of this invention is to provide a means of separating oil from water in a timely and efficient manner such that a continuous stream of separated oil is produced and such that a continuous stream of "dirty" fluid can be supplied the separator.

A further object of this invention is to provide a means of adjusting the rate of oil removal as desired and to also

2 provide a means of expanding the oil removal capacity of the separator if needed.

Yet another object of this invention is to provide a means of oil separation that is inexpensive to install, requires only a small amount of relatively simple machinery for operation, and on average needs only a slight amount of maintenance and upkeep. These and other objects and advantages of this invention will be disclosed herein.

SUMMARY OF THE PRESENT INVENTION

The preferred embodiment of the apparatus of the present invention solves the aforementioned problems in a straightforward and simple manner. This invention pertains to an oil/water separator that consists of a separator vessel having at least one chamber and a fluid inlet for supplying a contaminated fluid to this chamber. The contaminated fluid that fills the chambers contains oil that is to be separated and removed from the remainder of the fluid. A rotatable drum is positioned in an upper region of each of the chambers with each drum having a smooth outer perimeter or surface that is partially immersed within this contaminated fluid. This drum is rotated through the fluid such that an oil film adheres to its smooth outer perimeter or surface. An inclined blade mounted to the vessel engages this smooth outer perimeter or surface for the purpose of scraping or removing the oil film from the perimeter of the drum. This oil film then is directed to and collects in a trough mounted to the exterior of the vessel adjacent the blade so that the oil can be removed from the separator vessel apart from the remaining fluid in the chamber.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
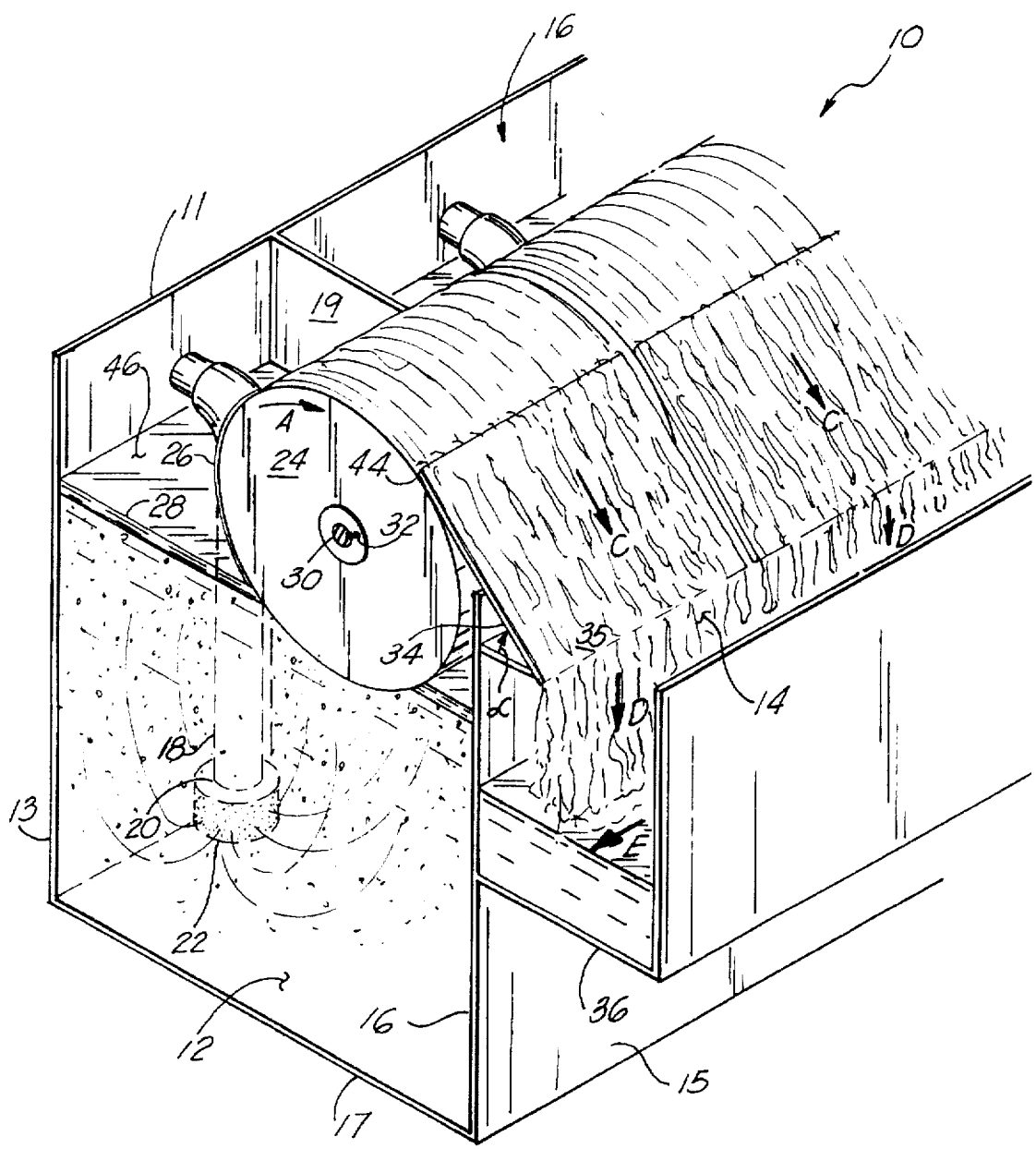
FIG. 1 is a pictorial view, in section, of the preferred embodiment of the invention during operation.

Referring to the drawing, there is shown the pertinent portion of oil-water separator 10, and more particularly the oil removal portion thereof. As is common with most oil-water separators, this separator 10 has a vessel 11 with side walls 13, 15 and end walls (not shown) and bottom 17, but is open at the top so that it receives a stream of contaminated or "dirty" fluid 12 on either a continuous or intermittent basis. This "dirty" fluid 12 is usually predominantly water with oil and other contaminants (both solid and liquid types) mixed therein. Such fluid 12 is sent to separator 10 for the separation of the contaminants (and especially the oil) from the water. The resulting water stream is then either recycled for re-use in the process from which it came or such water stream is further cleaned and/or filtered prior to being recycled and/or discharged. In any event, one of the first steps in cleaning "dirty" fluid 12 is to remove oil or other contaminants 14 from fluid 12 so that the remaining water stream can be further processed. The early and complete removal of oil and contaminants 14 from stream 12 enables any such downstream process to operate more efficiently and with less clogging or down-time.

Figure 2:
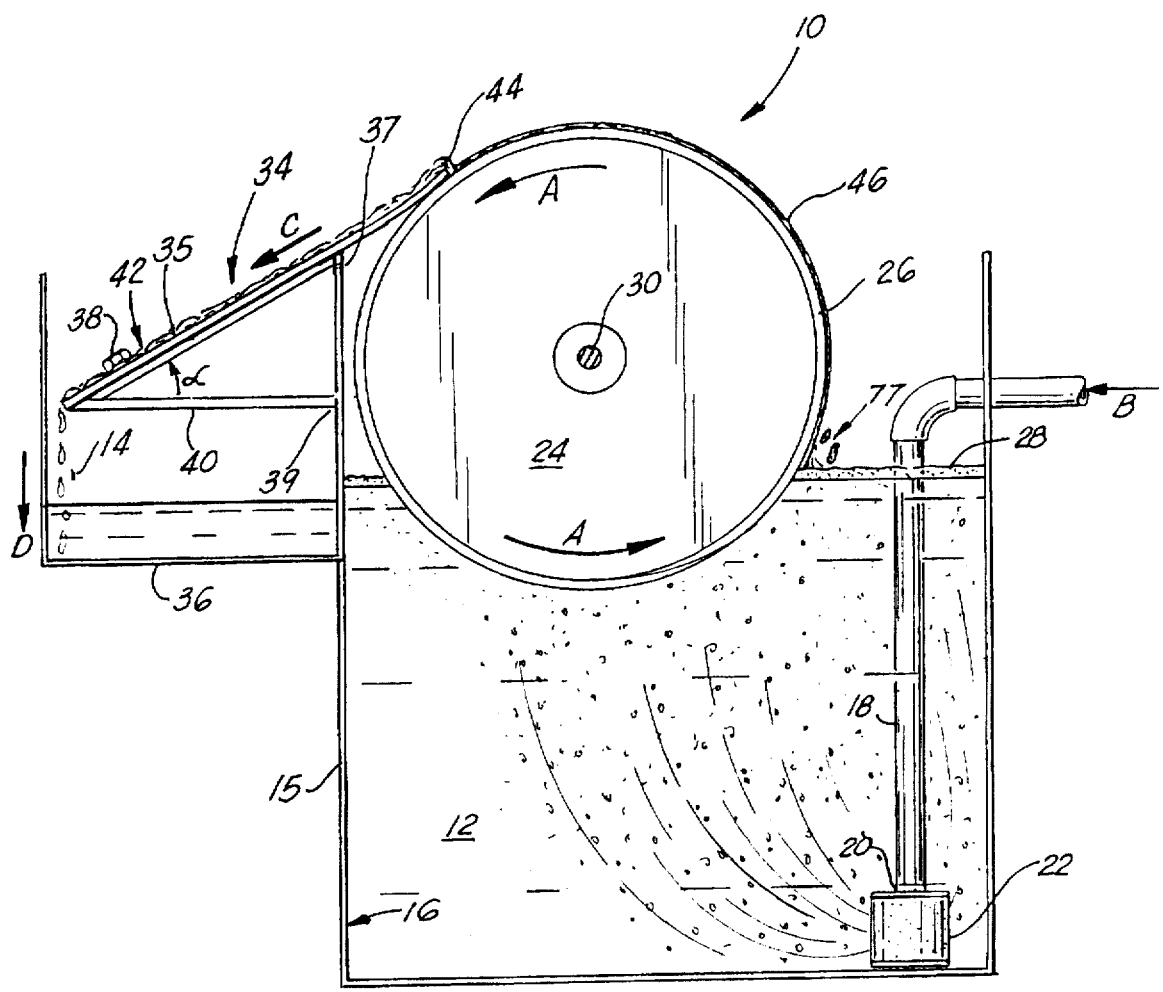
FIG. 2 is a side pictorial view, in section, of the embodiment of FIG. 1 during operation; and, FIG. 3 is a top, plan pictorial view of the embodiment of FIG. 1 during operation.

In the preferred embodiment shown in the drawing, and particularly FIGS. 1 and 2, contaminated or "dirty" fluid 12 enters a chamber or cell 16 of separator 10 through inlet pipe 18 as indicated by ARROWS B. Generally there are a plurality of such chambers 16 in each separator 10 and these chambers 16 are usually serially arranged thus having a common wall 19. Also, while inlet pipe 18 is disclosed with a bottom exit 20 in the bottom of chamber 16, such inlet pipe 18 may also discharge fluid 12 into an upper region of each chamber 16 if need be. There may also be a means of interconnecting each of the various chambers 16, such as through a weir or other passageway in the common wall 19 of adjacent chambers 16, so as to maintain a uniform liquid level all chamber 16 of in separator 10. The exact configuration of separator 10 can, of course, vary as needed or required.

Generally, "dirty" liquid 12 is aerated upon being discharged into its respective chamber 12. Such aeration can be accomplished via conventional aerator 22 affixed to discharge exit 20 of inlet pipe 18 or such aeration can be accomplished via separate piping coupled to a conventional air supply system. In any event, the aeration of fluid 12 aids in the removal of oil 14 (and other contaminants) therefrom by preventing any settlement within chamber 16.

A series of drums 24 extend longitudinally along an upper region of each chamber 16 and are positioned so that the outer surface or perimeter 26 of each such drum 24 dips slightly below liquid level 28 maintained in its respective chamber 16. Depending on the size of each chamber 16, there may be more than one dram 24 in each chamber if need be. Usually, these various drums 24 in each chamber will be co-axially aligned. However, if desired, these drums 24 in each chamber 16 may also be positioned parallel to each other or they may be oriented in some other configuration. The exact orientation of each drum 24 in each chamber 16 can vary so long as drums 24 aid in the removal of oil 14 from fluid 12.

It is preferable, however, for the various drums 24 located in the various chambers 16 of separator 10 to all be co-axially aligned with respect to each other so that they all can be mounted on a single shaft 30 journalled in the end walls (not shown) of separator vessel 11 and driven by a single drive assembly including a motor (not shown). In this fashion, these drums 24 will all rotate at the same speed. However, if need be, the various drums 24 mounted in separator 10 can be secured to a plurality of shafts 30 driven by different motors so that it will be possible to rotate these drums 24 at different speeds if such is desired. In any event, each drum 24 is usually secured to shaft 30 via key 32 which prevents the drum 24 from slipping upon shaft 30.

To ease the rotation of drums 24 by a drive assembly (not shown), these drums 24 are generally of hollow construction and are configured having a similarly sized outer diameter. However, another manner of constructing each drum 24 is possible as well as sizing the drums 24 of different diameters. In the preferred embodiment shown herein, each drum 24 is of hollow construction and of the same diameter. These drums are also preferably constructed of stainless steel so as to prevent corrosion and erosion, but drums 24 may also be constructed of any other material, such as another metal, ceramic, rubber, or plastic, depending on the operating conditions these drums 24 must withstand. In any event, no matter how each drum 24 is constructed, or its material of construction, each drum must be configured with a smooth, uninterrupted outer perimeter or surface or periphery 26. While the presence of a seam in perimeter 26 of drum 24 can be tolerated, it is preferable for perimeter 26 to be seamless or at least for any seam to be flush with perimeter 26.

The purpose of configuring drum 24 with as smooth a perimeter or periphery 26 is so that scraper or wiper blade 34 can remove the oil (or other contaminant) 14 that is carried by perimeter 26. This blade 34 extends over chamber 16 as best seen in FIGS. 1 and 2 and engages perimeter 26 of drum 24 as it rotates in the direction of ARROWS A. As a result of such engagement, blade 34 wipes or scrapes the film of oil 14 or any other solid or liquid contaminant in fluid 12 that adheres to perimeter 26 of rotating drum 24 and directs oil 14 into separate containment means 36 as described below.

Blade 34 is, as best shown in FIG. 1, mounted on vessel 11 so that it is inclined at an angle α from the horizontal plane such that the removed oil or contaminant 14 falls or travels downwardly along the upper surface 35 of blade 34 into adjacent chute or trough 36 mounted to the exterior of side wall 15 of vessel 11. Of course, the position of blade 34 is adjustable so that blade 34 can make proper angulated contact with drum 24. Such adjustment is typically accomplished via bolts 38 that thread into V-shaped support 40 (mounted to the exterior of side wall 15 at points 37, 39) upon which blade 34 rests. These bolts 38 will extend through slots 42 in blade 34 and support 40, thereby permitting blade 34 to be moved or adjusted as needed. Of course, any other method of securing blade 34 against drum 24 is also possible.

The drum-engaging end 44 of blade 34 can be tapered in the shape of a knife edge if this is desired. Such a tapered configuration of end 44 is so that blade 34 will remove as much oil 14 as possible from drum 24. However, end 44 of blade 34 can also be blunt or squared-off if such is desired. Also, it is preferable for blade 34 to be constructed of a rather rigid material, such as a metal or rubber or the like, so that it will retain its shape during use and will not be easily moved or deformed. It is also preferable for blade 34 to be constructed of a substance that can withstand wear, but the hardness of blade 34 should be less than the hardness of perimeter or periphery 26 of drum 24 so that as between the two, blade 34 will wear as compared with drum 24. This is because it is easier to replace blade 34 than drum 24 in separator 10. Also, while not shown, it may be desirable for blade 34 to be constantly biased, such as via a spring, against perimeter 26 of drum 24 so that constant contact between the two is maintained. This will be useful in the event blade 34 wears down resulting in a slight gap between perimeter 26 and blade 34. Such a gap is undesirable since the ability to further skim or remove oil 14 from drum 24 will be greatly reduced.

Ideally, blade 34 will be as wide as drum 24 is long (i.e. a matched set), but this is not critical since more than one blade 34 can scrape a drum 24. Also, the actual inclination (α) of blade 34 is not critical so long as the removed oil is permitted to travel along blade surface 35 of blade 34 toward trough 36.

Trough 36 is, as shown, mounted to the exterior of side wall 15 of vessel 11 and is inclined along its length so that the removed oil 14 will flow within trough 36 (ARROWS E) towards an exit (not shown) for subsequent removal from collection means or trough 36 and processing. While a rather rectangular or substantially square trough 36 is shown in cross-section in FIG. 2, trough 36 can also consist of a cylindrical member or be configured in another shape so long as it is capable of both receiving the oil (and other contaminants) 14 that are removed from drum 24 via blade 34 and also transport such oil/contaminant 14 elsewhere.

As illustrated by the drawing, separator 10 operates based upon the principal that oil is lighter than water and as such will rise in chambers 16 and form a thin film 46 on the surface of the fluid 12 at liquid level 28. Also, by the aeration of fluid 12, any contaminant will also freely circulate in chambers 16 for subsequent contact with the portion of perimeter 26 below film 46 at surface 28. As perimeter 26 of drum 24 is rotated through this film 46 and below liquid level 28, this oil film (and other contaminants) 46 will adhere to perimeter 26 and be carried upwardly by perimeter 26. Provided the rotational speed of drum 24 is not too great, any water that may also initially adhere to perimeter 26 will fall back to chamber 16 (as at 77 in FIG. 2) since water droplets are heavier than oil droplets. This loss of water from perimeter 26 leaves substantially oil film/contaminant 46 travelling with or adhering to perimeter 26 in the direction of ARROWS A. It is critical that the rotational speed of drum 24 not be too great so as to enable the water to drop or drain from perimeter 26 and fall back to chamber 16. If such rotation speed is too excessive, unwanted water will also travel with perimeter 26 and be removed along with oil film 46.

Figure 3:
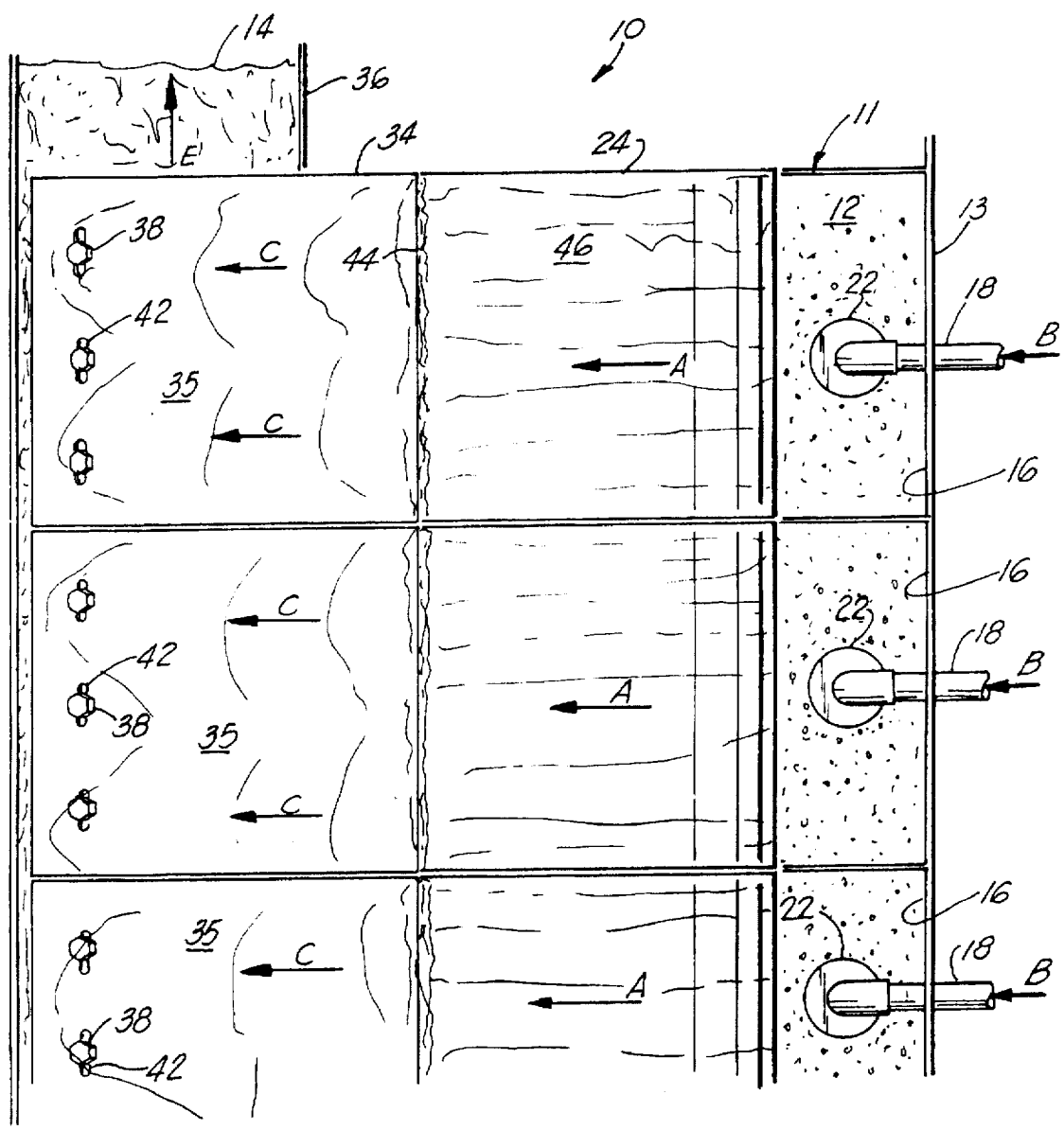

As best shown in FIG. 2, the oil film/contaminant 46 on perimeter 26 travels above liquid level 28 on drum 24. Upon reaching blade 34, this film 46 is removed or skimmed from perimeter 26 after which it travels downwardly along the upper surface 35 of blade 34 (ARROWS C of FIGS. 1–3) and drains (ARROWS D into) adjacent trough 36. Trough 36 collects this oil/contaminant 14 (i.e. oil film 46) for subsequent discharge or purification. Consequently, by adjusting the rotational speed of drum 24 and by immersing a portion of drum 24 into fluid 12 and insuring angulated contact of blade 34 with drum 24, the oil/contaminant 14 therein can be separated and removed for separate disposal.

As a result of passing through separator 10, the oil/contaminant 14 within fluid 12 is removed therefrom such that the remainder of the fluid 12 can be further processed without the need to design such processing equipment for such contaminants, other than perhaps trace amounts.

If desired, each drum 24 may be configured with a lip (not shown) at its opposite ends with blade 34 sized to fit between such lips. These lips serve the purpose of preventing any oil 14 from falling back into chamber 16 after having been removed by perimeter 26. They also serve the function of containing and retaining oil 14 and/or oil film 46 upon drum 24.

Since this method of oil/contaminant removal will result in an oil stream containing less water therein, the oil concentration level of the resulting stream will be higher. This indicates that the above rotating drum method is more efficient at oil/water separation since less water is now found than others in the separated stream. Also, since the volume of the oil stream is now smaller (i.e. it contains less water), any downstream processing equipment can be sized for a smaller volume of flow which reduces the cost and space requirements thereof. Also, this technology is relatively easy to retro-fit into existing equipment since it requires a minimum of machinery for operation. The main pieces of machinery required for the operation of separator 10 consist of a drum 24, matching blade 34, shaft 30, motor, and speed control devices. Furthermore, to increase the volume of the separated oil stream, the size of the drums can be changed, the rotational speed of the drums can be altered, or more drums can be installed, each only requiring a minimum in cost and maintenance.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An oil/water separator comprising:

(a) a separator vessel containing a plurality of chambers which are arranged in parallel therein;

(b) fluid inlet means having a discharge end positioned within each of said chambers for supplying a fluid to said chambers, said fluid containing oil and other contaminants that are to be separated and removed therefrom;

(c) a rotatable cylindrical drum positioned in an upper region of each of said chambers, said drums having a smooth outer perimeter that is partially immersed within said fluid;

(d) means for rotating said drums through said fluid such that an oil film adheres to said smooth outer perimeter of each of said drums;

(e) blade means angularly and adjustably mounted to said vessel and engaging said smooth outer perimeter above the level of said fluid in said chambers for removing said film from said perimeter;

(f) collection means mounted exteriorly to said vessel and positioned adjacent said blade means for the collection of said removed film therein, said blade means being inclined toward said collection means; and, (g) means for aerating said fluid within said chambers, said means for aerating being provided at said discharge end of said fluid inlet means and said fluid inlet means and said means for aerating being positioned in the lower region of said chambers near a side of said vessel opposite the mounted position of said drum and blade means.

2. The oil/water separator as set forth in claim 1, further comprising a plurality of drums in each said chamber.

3. The oil/water separator as set forth in claim 1, wherein said blade means comprise a plurality of individual blades.

4. The oil/water separator as set forth in claim 1, further comprising a raised edge secured to opposing ends of said drum.

5. The oil/water separator as set forth in claim 1, wherein said fluid inlet means comprise a discharge pipe for discharging said fluid into a lower region of said chamber.

6. The oil/water separator as set forth in claim 1, wherein said collection means comprise a trough secured to the exterior of said separator vessel and extending longitudinally thereof along said drum.

7. An oil/water separator comprising:

(a) a plurality of rotatable cylindrical drums extending into at least one chamber of a separator vessel having fluid inlet means for supplying a contaminated fluid thereto, said fluid inlet means having a discharge end positioned within said at least one chamber, each said drum having a smooth outer periphery that is partially immersed within said fluid, said contaminated fluid containing water and oil;

(b) means for rotating said drum through said fluid such that an oil/contaminant film adheres to said smooth outer periphery of said drum;

(c) angularly adjustable blade means mounted to said vessel and engaging said smooth outer periphery above the level of said fluid in said chamber for removing said film therefrom;

(d) means for aerating said fluid within said chamber, said means for aerating being provided at the discharge end of said fluid inlet means and said fluid inlet means and said means for aerating being positioned in the lower region of said chamber near a side of said vessel opposite the mounted position of said drums and blade means; and, (e) collection means positioned underneath said inclined blade means for the collection of said film therein, said blade means being inclined toward said collection means.

8. The oil/water separator as set forth in claim 7, wherein each of said drums are located in an upper region of said chamber.

9. The oil/water separator as set forth in claim 8, wherein said blade means are inclined downwardly away from each of said drums.

10. The oil/water separator as set forth in claim 9, wherein said collection means comprise a trough secured to said vessel adjacent said chamber and extending longitudinally thereof along each of said drums.

11. The oil/water separator as set forth in claim 10, further comprising a raised edge secured to opposing ends of each of said drums.

12. A method of separating oil from an oil containing fluid comprising the steps of:

(a) supporting one or more rotatable drums in an upper region of one or more chambers of a separator vessel, said drums having a smooth outer periphery that extends into said chambers;

(b) supplying an oil containing fluid to at least one said chamber, said oil containing fluid having a liquid level within said chamber that partially immerses said smooth outer periphery of said drums;

(c) rotating at least one said drum within said chamber through said oil containing fluid, said rotating drum developing an oil film on its smooth outer periphery;

(d) removing said film from said smooth outer periphery by an inclined blade means mounted to said vessel and in engagement with said smooth outer periphery above the level of said fluid in said chamber;

(e) collecting said film in an adjacent collection bin;

(f) aerating said oil containing fluid within said chamber with means for aerating said supplying of said oil containing fluid and said means for aerating being positioned in the lower region of said chamber near a side of said vessel opposite the mounted position of said one or more rotatable drums and blade means; and, (g) inclining said blade means downwardly away from said drum and toward a collection bin.

13. The method as set forth in claim 12, further comprising the step of constructing and arranging said collection bin as an open trough secured exteriorly to said separator vessel and extending longitudinally thereof along said drum.

* * * * *